(12) United States Patent
González Fernández et al.

(10) Patent No.: US 12,024,672 B2
(45) Date of Patent: Jul. 2, 2024

(54) CEMENT COMPRISING MAGNETIC NANOPARTICLES AND METHOD OF SETTING A SLURRY THEREOF

(71) Applicant: REPSOL, S.A., Madrid (ES)

(72) Inventors: María Ángeles González Fernández, Móstoles (ES); Ricardo Bezerra De Melo, Móstoles (ES); Luisa María Fraga Trillo, Móstoles (ES); Sabino Veintemillas Verdaguer, Madrid (ES); Álvaro Gallo Córdova, Madrid (ES); María Del Puerto Morales Herrero, Madrid (ES)

(73) Assignee: REPSOL, S.A., Madrid (ES)

( * ) Notice: Subject to any disclaimer, the term of this patent is extended or adjusted under 35 U.S.C. 154(b) by 22 days.

(21) Appl. No.: 17/782,158

(22) PCT Filed: Dec. 7, 2020

(86) PCT No.: PCT/EP2020/084856
§ 371 (c)(1),
(2) Date: Jun. 2, 2022

(87) PCT Pub. No.: WO2021/116008
PCT Pub. Date: Jun. 17, 2021

(65) Prior Publication Data
US 2023/0028768 A1    Jan. 26, 2023

(30) Foreign Application Priority Data
Dec. 9, 2019   (EP) .................................... 19383090

(51) Int. Cl.
*C09K 8/467*      (2006.01)
*C04B 14/30*      (2006.01)
(Continued)

(52) U.S. Cl.
CPC ............ *C09K 8/467* (2013.01); *C04B 14/308* (2013.01); *C04B 28/04* (2013.01); *C04B 2103/20* (2013.01); *C09K 2208/10* (2013.01)

(58) Field of Classification Search
CPC .. C09K 8/467; C09K 2208/10; C04B 14/308; C04B 28/04; C04B 2103/20
See application file for complete search history.

(56) References Cited

U.S. PATENT DOCUMENTS 4,691,774 A * 9/1987 Nelson ..................... C09K 8/46
166/291
2013/0122267 A1    5/2013 Riman et al.
2019/0245393 A1    8/2019 Pantic et al.

FOREIGN PATENT DOCUMENTS

DE     102015100538       7/2016
WO     WO 2008/146017 A1  12/2008
(Continued)

OTHER PUBLICATIONS

International Search Report and Written Opinion dated Feb. 22, 2021 for PCT Application No. PCT/EP2020/084856; 18 pages.
(Continued)

*Primary Examiner* — Crystal J Lee
(74) *Attorney, Agent, or Firm* — Squire Patton Boggs (US) LLP (57) ABSTRACT

Methods of cementing, cementing compositions made from the methods, and articles manufacturable by the cementing compositions are disclosed. The method can include mixing a cement composition and water to make a cement slurry and applying to the cement slurry an alternating magnetic field of from 25 mT to 60 mT at a frequency from 50 kHz to 200 kHz in order to set the cement slurry. The cement composition can have a cement and an amount of magnetic nanoparticles from 0.01 wt % to 10 wt % relative to the amount of cement (0.01% to 10% BWOC). The magnetic (Continued)

nanoparticles can have a mean particle size determined by Transmission Electron Microscopy (TEM) from 10 nm to 50 nm and a crystallite size determined by the Scherrer equation which is at least an 80% the mean particle size.

19 Claims, 3 Drawing Sheets

(51) Int. Cl.
  *C04B 28/04* (2006.01)
  *C04B 103/20* (2006.01)

(56) References Cited

FOREIGN PATENT DOCUMENTS

| WO | WO-2008146017 A1 | * | 12/2008 | ............ C04B 28/02 |
|---|---|---|---|---|
| WO | WO 2012/038699 A2 | | 3/2012 | |
| WO | WO-2012038699 A2 | * | 3/2012 | ......... C04B 40/0641 |
| WO | WO 2012/038699 A3 | | 5/2013 | |
| WO | WO 2017/011335 A1 | | 1/2017 | |
| WO | WO 2018/106181 A1 | | 6/2018 | |
| WO | WO-2018106181 A1 | * | 6/2018 | ............ C04B 14/34 |
| WO | WO 2018/106181 A8 | | 12/2018 | |

OTHER PUBLICATIONS

ISO 13322-1 (E) "Particle size analysis, image analysis methods—Part 1: Static image analysis methods"; Second edition; 32 pages; May 15, 2014.

ISO/TS 17200 (E) "Nanotechnology—Nanoparticles in powder form—Characteristics and measurements"; 14 pages; Jun. 1, 2013.

ISO 13099-2 (E) "Colloidal systems—Methods for zeta-potential determination—Part 2: Optical methods", First Edition; 26 pages; Jun. 15, 2012.

ISO 10426-2 "Recommended Practice for Testing Well Cements", First edition, ANSI/API Recommended Practice 10B-2 (Formerly 10B); 11 pages; Jul. 2005.

Luengo, et al: "Counterion and solvent effects on the size of magnetite nanocrystals obtained by oxidative precipitation", 2017 Journal of Materials Chemistry C; Sep. 13, 2016; vol. 4, pp. 9482-9488.

Stöber, et al: "Controlled growth of monodisperse silica spheres in the micron size range", Journal of Colloid and Interface Science1968; vol. 26, pp. 62-69.

Verges, et al: "Uniform and water stable magnetite nanoparticles with diameters around the monodomain-multidomain limit", J. Phys. D: Appl. Phys.; Jun. 19, 2008; vol. 41, Issue 134003 (10pp).

* cited by examiner

CEMENT COMPRISING MAGNETIC NANOPARTICLES AND METHOD OF SETTING A SLURRY THEREOF

CROSS-REFERENCE

This application is a National Stacie filing under 35 U.S.C. § 371 of International Patent Application No. PCT/EP2020/084856, filed Dec. 7, 2020, which claims the benefit of and priority to European Patent Application EP19383090.8 filed on Dec. 9, 2019, the contents of all of which are hereby incorporated by reference in their entireties for all purposes.

TECHNICAL FIELD

The present invention relates to a method of cementing, and to a cement used therein.

BACKGROUND ART

In well cementing technology, cement slurries are used to fill and seal the void space between a lining tube and the walls of a well bore. Thus, once drilled, the well bore is lined with a tube and a cement composition is pumped into the annular space between the walls of a well bore and the exterior surfaces of a lining tube disposed therein. The cement composition is allowed to set in the annular space, thus preventing the unwanted migration of fluids between zones or formations penetrated by the well bore. In order to provide adequate pumping time in which to place the cement into the desired location, the use of set retarders in the cement compositions is required. Nevertheless, this results in an extended waiting-on-cement time and cause delays in subsequent drilling or completion activities.

The phenomenon of hyperthermia using magnetic nanoparticles has been extensively investigated in biomedical applications or to generate localized heat in several materials. Nevertheless, due to their different nature, the possible application in different materials requires specific research.

U.S. Pat. No. 4,691,774 discloses hydraulic cement for well cementing including finely divided magnetic particles such as magnetite. By applying a continuous or intermittent magnetic field a mechanical response (e.g., movement, such as stirring the cement mass in situ) is sought. Nevertheless, no mention is made to the possibility of controlling the setting of the cement by the application of the magnetic field.

WO2008146017 discloses a method for well cementing in a lining tube in a bore hole wherein setting of the cement is achieved by applying a fluctuating electromagnetic or magnetic field. It is mentioned that the heating effect may be magnified by including within the cement slurry composition materials which either absorb electromagnetic radiation or which are caused to oscillate by an alternating magnetic field. As an example of the second option of materials as ferro, fern and superparamagnetic particles are mentioned. WO2012038699 discloses a method using a magnetic source to release a subterranean fluid additive in a subterranean formation.

WO2018106181 discloses an antenna embedded in a concrete including a cement and additions in the form of particles, wherein the particles comprise a magnetic and/or a metallic material.

Nevertheless, neither an example of said second option is included, nor a mention is made of the possible size and amount of the particles or of the characteristics of the magnetic field.

Thus, there continues to be a need to develop methods for controlling the cement setting, particularly which are useful for well cementing and, specifically, procedures that accelerate the setting by providing the needed heating effect at the required time.

SUMMARY OF INVENTION

Inventors have found that by applying an alternating magnetic field of specific characteristics to a cement slurry containing a relatively small amount of magnetic nanoparticles, such as magnetite nanoparticles, of a determined particle size and degree of crystallinity, the setting process of the cement can be controlled as required. Particularly, with a significantly low amount of magnetic nanoparticles, the required amount of heat is generated in a reduced period of time, such as 15 min, what makes that the cementing process is more cost-effective. Thus, such a cement composition and process are useful for several applications, particularly for well cementing.

Thus, one aspect of the present invention relates to a method of cementing comprising:
  a) providing a cement slurry by mixing:
    a cement composition comprising a cement and an amount of magnetic nanoparticles from 0.01 wt. % to 10 wt. % relative to the amount of cement (0.01% to 10% BWOC), wherein the magnetic nanoparticles have a mean particle size determined by Transmission Electron Microscopy (TEM) from 10 nm to 50 nm and a crystallite size determined by the Scherrer equation as disclosed herein below which is at least an 80% the mean particle size; and
    water; and
  b) applying to the cement slurry an alternating magnetic field of from 25 mT to 60 mT at a frequency from 50 kHz to 200 kHz in order to set the cement slurry.

The distinguishing combination of the specific particle size and high degree of crystallinity (defined by a crystallite size determined by the Scherrer equation which is equal to or higher than 80% the mean particle size) of the magnetic nanoparticles such as magnetite nanoparticles together with the particular intensity and frequency of the applied alternating magnetic field, allows uniformly increasing the temperature of the cement at the required degree in a period of time relatively short, and thus the timing of the cement setting can be controlled at will.

Without wishing to be bound by theory, such an alternating magnetic field causes the magnetic moment of the magnetic nanoparticles to switch. At higher frequencies the magnetic moment cannot follow the speed of the changing magnetic field, and so such magnetic moment remains blocked. Consequently, a more effective hyperthermia effect is produced at the frequencies defined herein above and below Another aspect of the invention relates to a cement composition comprising a cement, such as a hydraulic cement, and an amount of magnetic nanoparticles from 0.01 wt. % to 10 wt. % relative to the amount of cement (0.01% to 10% BWOC), wherein the magnetic nanoparticles have a mean particle size determined by Transmission Electron Microscopy (TEM) from 10 nm to 50 nm and a crystallite size determined by the Scherrer equation, as disclosed herein below, which is at least an 80% the mean particle size.

It is also part of the invention an article of manufacture obtainable by the method of cementing disclosed herein above and below, wherein before carrying out step b) the cement slurry is given a form of an article of manufacture (for instance by extrusion molding or by injection molding), and after step b) and, optionally, after additional shaping or otherwise refining, the article of manufacture is obtained.

BRIEF DESCRIPTION OF DRAWINGS

Some non-limiting examples of the present disclosure will be described in the following with reference to the appended drawings, in which.

DETAILED DESCRIPTION OF THE INVENTION

All terms as used herein in this application, unless otherwise stated, shall be understood in their ordinary meaning as known in the art. Other more specific definitions terms as used in the present application are as set forth below and are intended to apply uniformly throughout the specification and claims unless an otherwise expressly set out definition provides a broader definition.

The term "cement" refers to non-hydrated cement powder.

The terms "particle size" and "particle size distribution", as used herein, are in terms of diameter irrespective of the actual particle shape. The term "diameter", as used herein, means the equivalent sphere diameter, namely the diameter of a sphere having the same diffraction pattern, when measured by laser diffraction, as the particle.

A "narrow particle size distribution" is such that the vast majority of particles have the same size (the main size) and those particles that do not have this size, have sizes very close to the main size. The mean particle size was calculated by adjusting the data of the sizes obtained from the photos of the TEM (transmission electron microscope) to a logarithmic distribution. It is considered that the distribution of sizes is narrow (narrow particle size distribution) if the width of the peak of the logarithmic distribution at half height (Full Width at Half Maximum=FWHM) collects a maximum of 25% of the total population of sizes that appear in the distribution.

The "full width at half maximum (FWHM)" refers to the extent of function given by the difference between the two extreme values of the independent variable at which the dependent variable is equal to half of its maximum value. In other words, it is the width of a spectrum curve measured between those points on the y-axis which are half the maximum amplitude.

The term "alternating magnetic field" is to be understood as a magnetic field that changes direction periodically.

The term "room temperature" refers to a temperature from about 25 to 30° C., particularly at about 26.7° C.

It is noted that, as used in this specification and the appended claims, the singular forms "a", "an", and "the" include plural referents unless the context clearly dictates otherwise.

The term "BWOC" means by weight of cement.

As mentioned above, the cement composition of the invention and used in the method of the invention comprises a cement, such as a hydraulic cement, and an amount of magnetic nanoparticles from 0.01 wt. % to 10 wt. % relative to the amount of cement, wherein the magnetic nanoparticles such as magnetite nanoparticles have a mean particle size determined by Transmission Electron Microscopy (TEM) from 10 nm to 50 nm, particularly from 20 nm to 40 nm, such as 34 nm, and a high degree of crystallinity, that is a crystallite size determined by the Scherrer equation which is at least an 80% the mean particle size.

In a particular embodiment, optionally in combination with one or more features of the particular embodiments defined above, the amount of magnetite nanoparticles is from 0.025 wt. % to 1.15 wt. % relative to the amount of cement (0.025% to 1.15% BWOC), and most preferably from 0.05 wt. % to 0.15 wt. % relative to the amount of cement (0.05% to 0.15% BWOC).

Magnetic or Superparamagnetic Nanoparticles

Example of magnetic materials include magnetite ($Fe_3O_4$), cobalt ferrite, nickel ferrite and manganese ferrite.

In general, magnetic nanoparticles such as magnetite ($Fe_3O_4$) nanoparticles can be synthesized in aqueous media by the oxidative precipitation route (cf. M Andres Verges et al. "Uniform and water stable magnetite nanoparticles with diameters around the monodomain-multidomain limit", *J. Phys. D: Appl. Phys.* 41 (2008) 134003 (10 pp); see the Experimental section—Synthesis). A metal salt solution is added to the alkaline media containing a mild oxidant in an oxygen free atmosphere and the reaction is carried out first under stirring for 15 min and after this time, at 90° C. for 24 h without agitation to obtain the magnetic nanoparticles.

The reagents employed in the oxidative precipitation could be $SO_4^{2-}$, $Cl^-$ and Br as metal precursors, $NaNO_3$ and $KNO_3$ as oxidants and NaOH and KOH to promote hydrolysis. (cf. Luengo, Y. et al. "Counterion and solvent effects on the size of magnetite nanocrystals obtained by oxidative precipitation", *J. Mater Chem C*, 2017, Vol. 4, pp. 9482-9488). Particles of various spinel ferrites can be prepared by partial or complete replacement of Fe2+ ions in magnetite ($Fe_3O_4$) with other divalent transition-metal ions ($Co^{2+}$, $Ni^{2+}$, $Mn^{2+}$).

Reaction rate and therefore particle size can be controlled by the metal salt concentration and the presence of ethanol in the media. For instance, a concentration of $FeSO_4 \cdot 7H_2O$ of about $2.4 \times 10^{-2}$ M, a base concentration equal to $7.0 \times 10^{-2}$ M and a water/ethanol ratio equal to one leads to the formation of the smallest particles, such as of about 30 nm in diameter. Similar particle size but larger production up to grams can be obtained using a concentration of 0.2 M Fe(II), 0.2 M $NO_3^-$, an excess [OH-] of 0.02 M and a mixture of ethanol 25 wt % in water.

Particle size and shape can be measured by Transmission Electron Microscopy (TEM) using a Jeol 100 keV microscope (see procedure in the Example below).

Thus, magnetite nanoparticles having a mean particle size from 10 nm to 50 nm, particularly from 20 to 40 nm, such as 34 nm, with a narrow particle size distribution and a high degree of crystallinity (i.e. having a crystallite size determined by the Scherrer equation which is at least an 80% the mean particle size) can be obtained.

In an embodiment of the cement composition, optionally in combination with one or more features of the particular embodiments defined above, the magnetic nanoparticles such as magnetite nanoparticles have a particle size distribution such that the width of the peak of the logarithmic distribution of the sizes obtained from the photos of the TEM at half height, i.e. the full width at half maximum (FWHM), is equal to or lower than 25% of the total population of sizes that appear in the distribution. The logarithmic distribution of the sizes obtained from the photos of the TEM at half height can be obtained as disclosed in ISO: 13322-1:2014(E) "Particle size analysis, image analysis methods".

For particle size distributions, using a volume base calculation, the mean diameter is the average diameter (value given by analyzing the images given by a Jeol 100 keV microscope; see procedure in the Example below).

Magnetic characterization of the samples can be carried out in a vibrating sample magnetometer (MLVSM9 MagLab 9T, Oxford Instruments) at room temperature.

Figure 5:
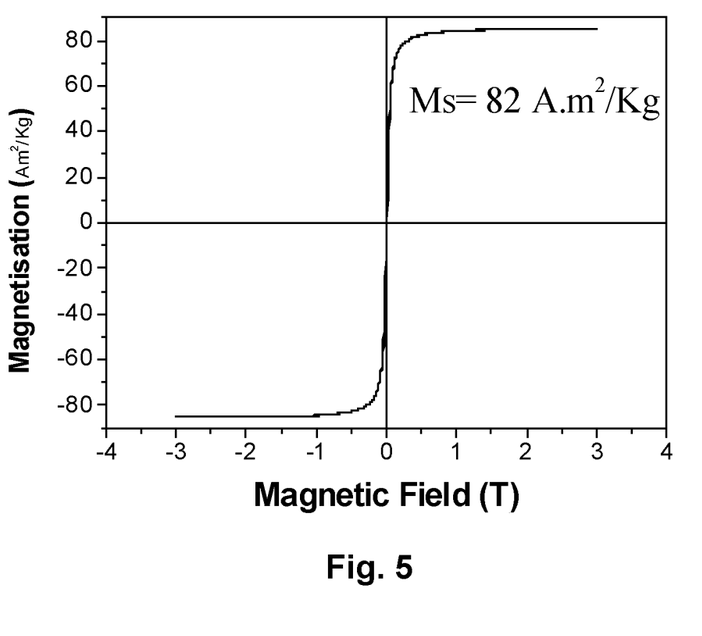
FIG. 5 shows the magnetic characterization of the samples carried out in a vibrating sample magnetometer (MLVSM9 MagLab 9T, Oxford Instruments) at room temperature.

Magnetization curves are recorded by first saturating the sample in a field of 3 T, as shown in FIG. 5. Then, the saturation magnetization (Ms) is determined by extrapolating to infinite field the experimental results obtained in the high field range where magnetization linearly increases with 1/H, where H is the magnetic field strength. Particularly, the obtained magnetic nanoparticles have a high saturation magnetization (Ms), namely over 80 $Am^2/Kg$ of nanoparticles. Thus, in another embodiment, optionally in combination with one or more features of the particular embodiments defined above, the magnetic nanoparticles are ferrites having a saturation magnetisation (Ms) equal to or higher than 50 $Am^2/Kg$, particularly from 50 $Am^2/Kg$ to 94 $Am^2/Kg$.

The term "ferrite" refers to a ceramic-like material with magnetic properties that are useful in many types of electronic devices. They are composed of iron oxide and one or more other metals in chemical combination. A ferrite is usually described by the formula M(FexOy), where M represents any metal that forms divalent bonds, such as nickel ferrite ($NiFe_2O_4$), manganese ferrite ($MnFe_2O_4$); cobalt ferrite ($CoFe_2O_4$), all being spinel minerals.

The crystallite size ($D_{XRD}$) is calculated from powder X-ray diffraction spectrum, particularly, from the broadening of the (3 1 1) reflection of the spinel structure using Scherrer equation (cf. ISO/TS 17200:2013 (E) "Nanotechnology—Nanoparticles in powder form—Characteristics and measurements").

The Scherrer equation relates the size of sub-micrometre particles, or crystallites, in a solid to the broadening of a peak in a diffraction pattern and allows determining the size of particles of crystals in the form of powder. It can be written as:

$$\tau = \frac{K\lambda}{\beta \cos\theta}$$

where:
τ is the mean size of the ordered (crystalline) domains, which may be smaller or equal to the grain size;
K is a dimensionless shape factor, with a value close to unity. The shape factor has a typical value of about 0.9, but varies with the actual shape of the crystallite;
λ is the X-ray wavelength;
β is the line broadening at half the maximum intensity (FWHM), after subtracting the instrumental line broadening, in radians;
θ is the Bragg angle.

The degree of crystallinity refers to the degree of structural order of the nanoparticles. It is measured by means of X-ray diffraction, that returns information about the crystalline planes of the material of which the nanoparticle is composed. Each peak is a family of planes diffracting coherently and the width of the peak is proportional to the crystal order or crystal size. It is calculated through the Scherrer equation. The Scherrer equation is used in determining the particle size of crystals in powder form. The closer the particle size measured by the TEM approaches the crystal size measured by X-ray diffraction, the greater the crystalline order. For particles above 10 nm, such as of about 20 nm, high crystallinity would mean that the match (between TEM and RX) should be greater than 80%. The degree of crystallinity was determined by comparing TEM sizes and X-Ray diffraction sizes.

Magnetic nanoparticles used in the cement of the present disclosure are characterized by having a mean particle size determined by Transmission Electron Microscopy (TEM) from 10 to 50 nm, such as of 20 nm, and a crystallite size determined by the Scherrer equation which is at least an 80% the mean particle size, this indicating that the degree of crystallinity is very high showing a monocrystal character. These magnetic nanoparticles such as magnetite nanoparticles also present high colloidal stability at pH 7 in water due to the hydrophilic coating provided by anions such as sulfate that remain attached at the nanoparticle surface after the synthesis in spite of the washing process. Thus, particularly the magnetic nanoparticles used in the cement of the present disclosure have a hydrophilic coating.

The magnetite nanoparticles can optionally be provided with a protective coating. Thus, in another embodiment, optionally in combination with one or more features of the particular embodiments defined above, the magnetic nanoparticles such as magnetite nanoparticles have a hydrophilic shell (such as a silica ($SiO_2$) shell). Particularly, the hydrophilic shell has a thickness from 0.5 to 20 nm. A silica shell can be prepared by the Stöbers method (cf. Stöber, W. et al. "Controlled growth of monodisperse silica spheres in the micron size range". *Journal of Colloid and Interface Science.* 1968, Vol. 26, pp. 62-69).

In order to control the thickness of the hydrophilic shell in order to obtain magnetic nanoparticles having a higher stability in an aqueous media, such as the cement slurry, the surface charge is determined from the electrophoretic mobility measurements by Dynamic light scattering (DLS) according to ISO 13099-2 2012 (E). Particularly, the magnetic nanoparticles having a hydrophilic shell have a surface charge from 20 to 40 mV.

The term "hydrophilic" is used herein to refer to any coating or surface that tends to stabilize the particles in an aqueous colloidal suspension, avoiding aggregation.

Stability in aqueous suspensions is evaluated from the surface charge of the nanoparticles in water at pH 7. A negative or positive surface charge above±20 mV assures long time colloidal stability.

Examples of cements that can be used in the cement composition and method of the present invention include, without being limited to, hydraulic cements. Hydraulic cements include Portland cements. Particularly, example of Portland cements that can be suitable for use in the present invention are classified according to API as Class A, B, C, H and G cements according to American Petroleum Institute, Recommended Practice for Testing Well Cements, API Specification 10B-2 (ISO 10426-2), First edition, July 2005. More particularly, the Portland cement for high temperature subsurface mostly applied are Class G and H cements.

In a particular embodiment of the cement composition, optionally in combination with one or more features of the particular embodiments defined above, the cement is a hydraulic cement such as a Portland cement, more particularly a Portland cement classified as Classes A, B, C, G or H, even more particularly a Portland cement classified as Class G.

As mentioned above the method of cementing of the present disclosure comprises providing a cement slurry by mixing the cement composition as defined above with water, and applying, in the place where the cement slurry is located, an oscillating magnetic field as defined above.

In an embodiment of the method of the invention, optionally in combination with one or more features of the particular embodiments defined above, the frequency of the alternating magnetic field is from 100±5 kHz, more particularly of 96 kHz.

In an embodiment of the method of the invention, optionally in combination with one or more features of the particular embodiments defined above, the alternating magnetic field is applied for a period of time from 1 min to 25 min, particularly from 10 to 15 min.

As mentioned above by combining such an amount of magnetic nanoparticles of the abovementioned specific particle size and degree of crystallinity together with specific the alternating magnetic field, allows uniformly increasing the temperature of the cement at the required degree in a period of time relatively short.

In an embodiment of the method of the invention, optionally in combination with one or more features of the particular embodiments defined above, the magnetic nanoparticles are magnetite nanoparticles. As shown in the examples, in a period of time of up to 15 min an increase of temperature equal to or higher than 3.5° C., such as from 3.6° C. to 23° C., can be uniformly produced, which is optimum to accelerate the cement setting time.

The cement composition used in the method of the invention can further comprise additives such as retarders, dispersants, fluid loss controls, and accelerator.

For certain applications, such as for well cementing, the addition of a retarder in cement compositions is required in order to extend the setting times of the slurry so that adequate pumping time is provided to place the cement into the desired extent and location. Thus, in another embodiment, optionally in combination with one or more features of the particular embodiments defined above, the cement composition used in the method of the invention further comprising a retarder.

Examples of retarders that can be used in the composition cement of the present invention include, without being limited to, lignosulfonates, organophosphates, hydroxycarboxylic acids. The retarder is added in an amount depending on temperature, type and required time to delay the cement set.

In another embodiment of the method of the invention, optionally in combination with one or more features of the particular embodiments defined above, the method is for pavement foundation; cementing maritime works; and the manufacture of structures, bricks, cobblestones, concrete blocks, and furniture.

In another embodiment of the method of the invention, optionally in combination with one or more features of the particular embodiments defined above, the method is for cementing a pipe string in a well bore.

In cementing wellbores, a pipe string is disposed into the well bore leaving an annular space between the pipe string and the well bore. Then, a cement slurry is delivered, i.e. by injection or by pumping, into the annular space, and it is allowed to set in the annular space.

Thus, in an embodiment, optionally in combination with one or more features of the particular embodiments defined above, the method of cementing a pipe string in a well bore comprises:
a) providing a cement slurry by mixing:
  a cement composition comprising an cement and an amount of magnetic nanoparticles from 0.01 wt. % to 10 wt. % relative to the amount of cement (0.01% to 10% BWOC), wherein the magnetic nanoparticles have a mean particle size determined by Transmission Electron Microscopy (TEM) from 10 nm to 50 nm and a crystallite size determined by the Scherrer equation which is at least an 80% the mean particle size; and
  water; and
b) delivering the cement slurry into an annular space left between a pipe string and a well bore;
c) applying to the cement slurry an alternating magnetic field of from 25 mT to 60 mT at a frequency comprised from 50 kHz to 200 kHz in order to set the cement slurry.

All the particular embodiments defined for the cement composition of the present disclosure are also particular embodiments for the method of cementing comprising the use of the mentioned cement composition.

In another embodiment, optionally in combination with one or more features of the particular embodiments defined above, a method of cementing comprises:
a) providing a cement slurry by mixing:
  a cement composition comprising a cement and an amount of magnetic nanoparticles from 0.01 wt. % to 10 wt. % relative to the amount of cement (0.01% to 10% BWOC), wherein the magnetic nanoparticles have a mean particle size determined by Transmission Electron Microscopy (TEM) from 10 nm to 50 nm and a crystallite size determined by the Scherrer equation which is at least an 80% the mean particle size; and
  water;
b) giving to the cement slurry a form of an article of manufacture; and
c) applying to the cement slurry an alternating magnetic field of from 25 mT to 60 mT at a frequency from 50 kHz to 200 kHz in order to set the cement slurry and thus, optionally, after additional shaping or refining, obtaining an article of manufacture.

The cement slurry can be given a form of the article of manufacture of interest by any method known in the art such as by extrusion molding or by injection molding.

Throughout the description and claims the word "comprise" and variations of the word, are not intended to exclude other technical features, additives, components, or steps.

Furthermore, the word "comprise" encompasses the case of "consisting of".

The following examples and drawings are provided by way of illustration, and they are not intended to be limiting of the present invention. Furthermore, the present invention covers all possible combinations of particular and preferred embodiments described herein.

EXAMPLES

Example 1. Preparation of Magnetite Nanoparticles

Figure 1:
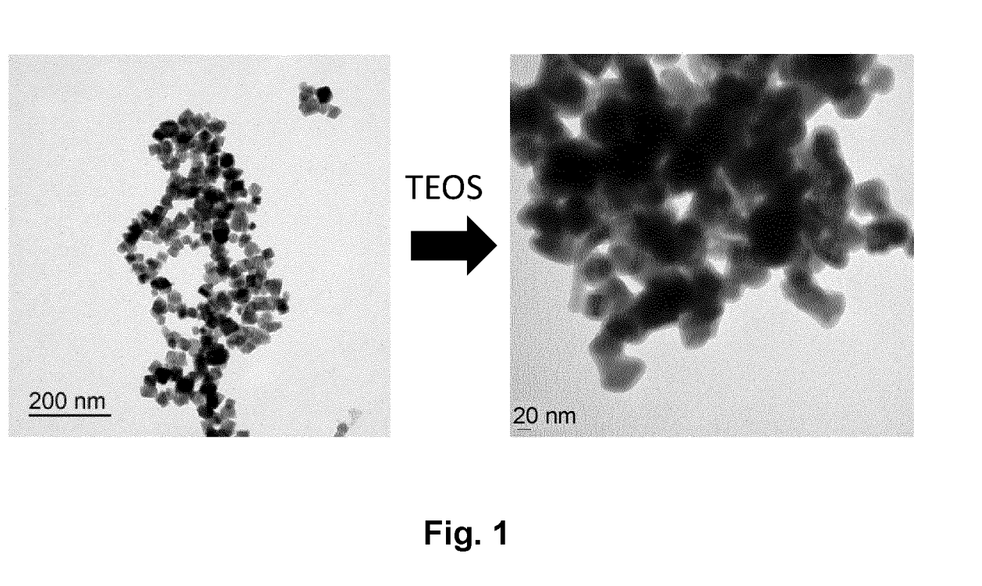
FIG. 1 shows the Transmission Electron Microscopy (TEM) images for magnetite nanoparticles of Example 1 and of Example 2 (having a hydrophilic shell of silica); TEOS: tetraethyl-orthosilicate).
Figure 2:
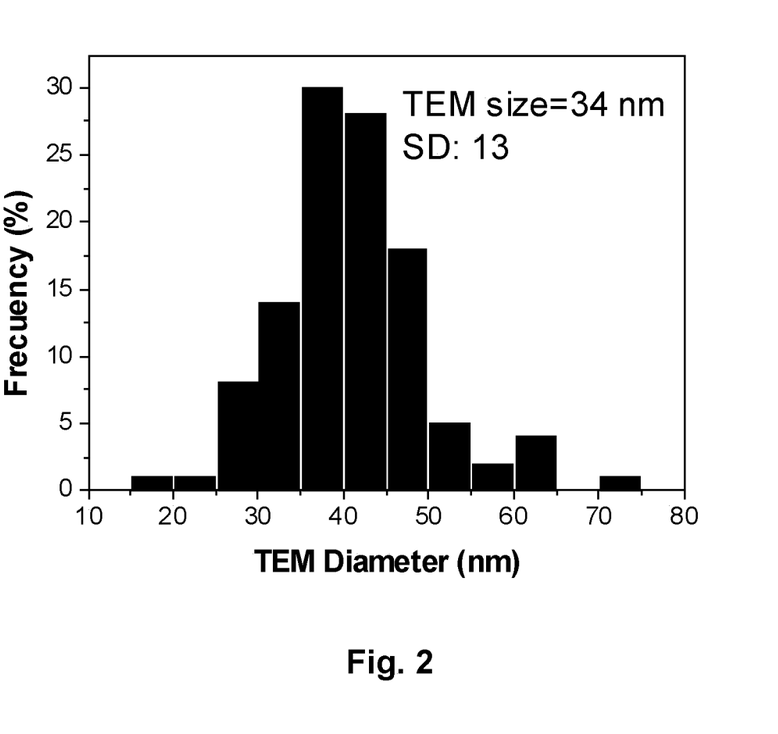
FIG. 2 shows the TEM histogram for magnetite nanoparticles of Example 1.
Figure 3:
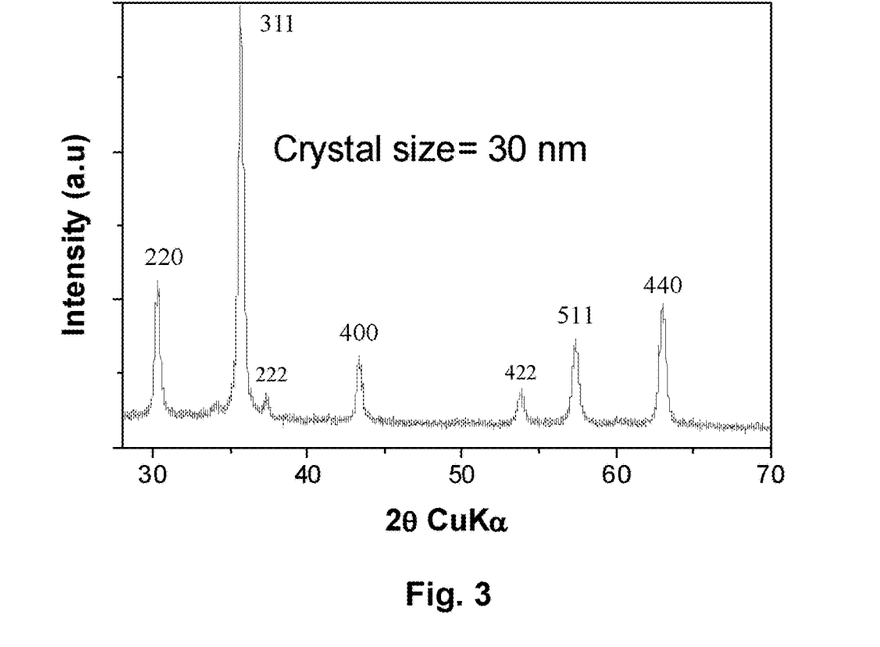
FIG. 3 shows the crystallite size ($D_{XRD}$) calculated from the broadening of the (3 1 1) reflection of the spinel structure using Scherrer equation of the magnetic nanoparticles of Example 1.

Magnetite nanoparticles were obtained following the process disclosed above (cf. M Andres Verges et al.) using a concentration of $FeSO_4.7H_2O$ of about 0.2 M. The obtained magnetic nanoparticles had a mean particle size of 34 nm, a median particle size of 40 nm (see FIG. 1, and FIG. 2), and a crystallite size of 30 nm (determined as explained above by the Scherrer equation; see FIG. 3), this indicating a high degree of crystallinity of the magnetite nanoparticles.

Particle size was measured by Transmission Electron Microscopy (TEM) using a Jeol 100 keV microscope. TEM samples were prepared by placing one drop of a dilute suspension of magnetite nanoparticles in water on a carbon coated copper grid and allowing the solvent to evaporate slowly at room temperature. The mean particle size and distribution was evaluated by measuring at least 100 particles.

The phase of the magnetite particles was identified by powder X-ray diffraction. The X-ray patterns were collected between 10° and 80° (2θ) in a Bruker D8 Advance diffractometer with Cu Kα radiation (i.e. 1.5418 Å). The crystallite size ($D_{XRD}$) was calculated from the broadening of the (3 1 1) reflection of the spinel structure using Scherrer equation. Samples were prepared by diluting the magnetite powder in KBr at 2% by weight and following compression of the mixture, pressing into a pellet.

Colloidal suspensions of these particles were directly obtained by simple ultrasonic treatment of the powders leading to very stable ferrofluids at pH 7 or lower.

Hydrodynamic size of the nanoparticles in suspensions was measured by photon correlation spectroscopy in a NanoZsizer from Malvern Instruments.

Example 2. Preparation of Magnetite Nanoparticles Having a Hydrophilic Shell A hydrophilic shell of silica was placed over the magnetite nanoparticles by the Stöber method, hydrolysis of an alkoxide in alkaline media.

A mixture containing 100 mg of the particles in 200 mL of 2-propanol and 100 mL of distilled water was sonicated for 15 min at 20° C. Then, 20 mL of ammonium hydroxide was added to the mixture and, while sonicating, tetraethyl-orthosilicate (TEOS) was added dropwise and the mixture was left under sonication for another 15 min. The sample was then collected by centrifugation at 8000 RCF for 45 min, washed several times with ethanol and then suspended in water.

Example 3. Preparation of a Cement Mixture Comprising Magnetite Nanoparticles A cement slurry (A) was prepared by mixing 2 g of water, 4.44 g of cement class G, 6.44 mg (i.e. a 0.145 wt. % relative to the amount of cement (0.145% BWOC)) of the magnetite nanoparticles obtained in Example 1 under ultrasound stirring for 5 minutes.

Another cement slurry (B) was prepared by mixing the same components, but with an amount of 3.22 mg of the magnetite nanoparticles of Example 1 (i.e. a 0.0725 wt. % relative to the amount of cement (0.0725% BWOC)).

An additional cement slurry (S) was prepared by mixing the same components, but with an amount of 64.4 mg of the magnetite nanoparticles having a hydrophilic shell of Example 2 (i.e. a 1.45 wt. % relative to the amount of cement (1.45% BWOC).

Setting of the Cement Mixture

A 2 ml sample of each one of the cements slurries above (A, B, and S) was placed in an inductor and left therein for 10 minutes to stabilize the temperature. Then, an alternating magnetic field was applied for 15 min using an apparatus having an inductor consisting of a coil of 7 cm bore diameter and 20 cm long, working at the intensities and frequencies shown in Table 1 below. Temperature was recorded with a fiber optic temperature sensor from Osensa. The results are shown in Table 1.

TABLE 1

| Sample | % BWOC | delta T (° C.) | f (kHz) | Field (mT) | Ms ($Am^2/Kg$) |
|---|---|---|---|---|---|
| A-1 | 0.145 | 23 | 96 | 50 | 82 |
| B-1 | 0.0725 | 12 | 96 | 50 | 82 |
| A-2 | 0.145 | 0.6 | 202 | 20 | 82 |
| B-2 | 0.0725 | 0.5 | 202 | 20 | 82 |
| S (+ SiO2) | 1.45 | 20 | 96 | 50 | 82 |

% BWOC: wt. % relative to the weight of cement.

Figure 4:
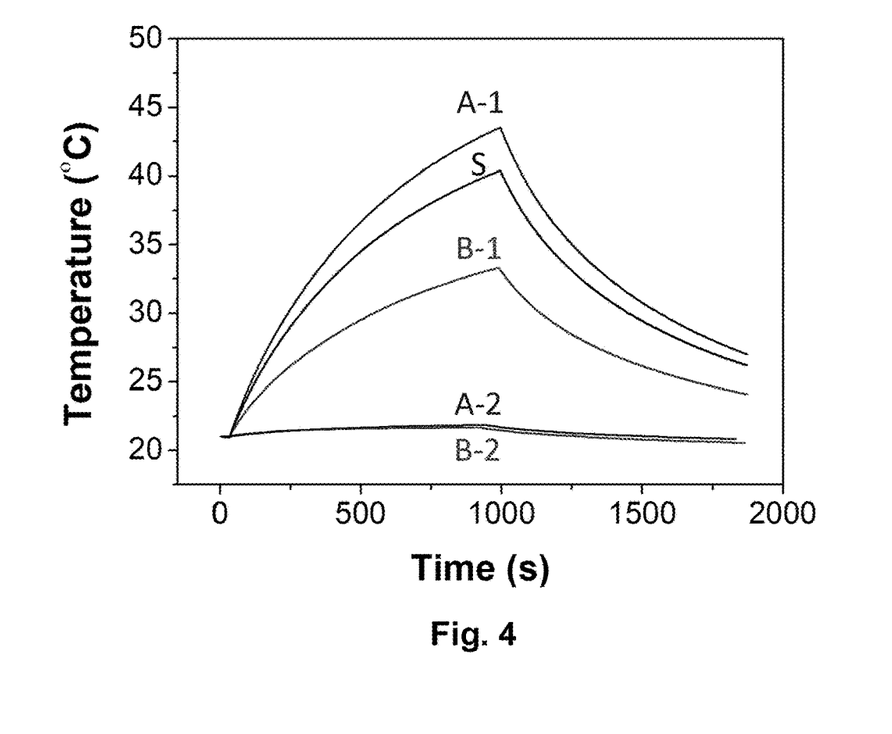
FIG. 4 shows the variation of the temperature after applying an alternating magnetic field of the intensities and frequencies shown in Table 1 for cement slurries A, B and S.

Sample S has a silica coating obtained as explained in Example 2. Results of samples A-1, B-1, A-2, B-2, and S are shown in FIG. 4.

By carrying out the method of the invention (see samples A-1, B-1, and S), a significant increment in temperature at extreme low concentrations of nanoparticles added to the slurry is observed. This controlled ΔT assures a reduction of the curing time of the slurry.

In comparative examples provided by samples A-2 and B-2 it is shown that, when the intensity and the frequency of the magnetic field is not within the ranges defining the method of the invention, the temperature increase is significantly lower.

CITATION LIST

1. U.S. Pat. No. 4,691,774;
2. WO2008146017
3. Andres Verges, M. et al. "Uniform and water stable magnetite nanoparticles with diameters around the monodomain-multidomain limit", *J. Phys. D: Appl. Phys.* 41 (2008) 134003 (10 pp);
4. Luengo, Y. et al. "Counterion and solvent effects on the size of magnetite nanocrystals obtained by oxidative precipitation", *J. Mater Chem C,* 2017, Vol. 4, pp. 9482-9488.
5. ISO: 13322-1:2014(E) Particle size analysis, image analysis methods;
6. ISO/TS 17200:2013 (E) "Nanotechnology—Nanoparticles in powder form—Characteristics and measurements";
7. Stöber, W. et al. "Controlled growth of monodisperse silica spheres in the micron size range". *Journal of Colloid and Interface Science.* 1968, Vol. 26, pp. 62-69;
8. ISO 13099-2 2012 (E) "Colloidal systems—Methods for zeta-potential determination—Part 2: Optical methods".
9. Recommended Practice for Testing Well Cements, API Specification 10B-2 (ISO 10426-2), First edition, July 2005.

The invention claimed is:

1. A method of cementing comprising:
a) providing a cement slurry by mixing:
a cement composition comprising a cement and an amount of magnetic nanoparticles from 0.01 to 10 by weight of cement (0.01% to 10% BWOC), wherein the magnetic nanoparticles have a mean particle size determined by Transmission Electron Microscopy (TEM) from 10 nm to 50 nm and a crystallite mean size determined by Scherrer equation which is at least an 80% the mean particle size,
wherein the Scherrer equation is $$\tau = \frac{K\lambda}{\beta \cos\theta}$$

wherein:
τ is the crystallite mean size;
K is a dimensionless shape factor having a value of 0.9;
λ is X-ray wavelength;
β is line broadening at half maximum intensity (FWHM) in radians, after subtracting instrumental line broadening; and
θ is Bragg angle; and
water; and
b) applying to the cement slurry an alternating magnetic field of from 25 mT to 60 mT at a frequency from 50 kHz to 200 kHz in order to set the cement slurry.

2. The method of cementing according to claim 1, wherein the magnetic nanoparticles have a particle size distribution defined by a logarithmic distribution of particle sizes obtained by TEM such that the logarithmic distribution has a full width at half maximum (FWHM) which is equal to or lower than 25% of total population of sizes that appear in the logarithmic distribution.

3. The method of cementing according to claim 2, wherein the magnetic nanoparticles have a hydrophilic shell.

4. The method of cementing according to claim 2, wherein the frequency of the alternating magnetic field is 100±5 kHz.

5. The method of cementing according to claim 2, wherein the magnetic nanoparticles are magnetite nanoparticles.

6. The method of cementing according to claim 1, wherein the magnetic nanoparticles have a hydrophilic shell.

7. The method of cementing according to claim 1, wherein the frequency of the alternating magnetic field is 100±5 kHz.

8. The method of cementing according to claim 1, wherein the alternating magnetic field is applied for a period of time from 1 min to 25 min.

9. The method of cementing according to claim 1, wherein the magnetic nanoparticles are magnetite nanoparticles.

10. The method of cementing according to claim 1, wherein the cement is a Portland cement.

11. The method of cementing according to claim 1, wherein the cement composition further comprises a retarder.

12. The method of cementing according to claim 1, wherein the method is for pavement foundation; cementing maritime works; and the manufacture of structures, bricks, coblestones, concrete blocks, and furniture.

13. The method of cementing according to claim 1, wherein the method is for cementing a pipe string in a well bore.

14. A cement composition comprising a cement and an amount of magnetic nanoparticles from 0.01 to 10 by weight of cement (0.01% to 10% BWOC), wherein the magnetic nanoparticles have a mean particle size determined by Transmission Electron Microscopy TEM from 10 nm to 50 nm and a crystallite mean size determined by Scherrer equation which is at least an 80% the mean particle size,
wherein the Scherrer equation is $$\tau = \frac{K\lambda}{\beta \cos\theta}$$

wherein:
τ is the crystallite mean size;
K is a dimensionless shape factor having a value of 0.9;
λ is theX-ray wavelength;
β is line broadening at half maximum intensity (FWHM) in radians, after subtracting instrumental line broadening; and
θ is Bragg angle.

15. The cement composition according to claim 14, wherein the magnetic nanoparticles have a particle size distribution defined by a logarithmic distribution of particle sizes obtained by TEM such that the logarithmic distribution has a full width at half maximum (FWHM) which is equal to or lower than 25% of total population of sizes that appear in the logarithmic distribution.

16. The cement composition according to claim 15, wherein the magnetic nanoparticles have a hydrophilic shell.

17. The cement composition according to claim 15, wherein the magnetic nanoparticles are magnetite nanoparticles.

18. The cement composition according to claim 14, wherein the magnetic nanoparticles have a hydrophilic shell.

19. The cement composition according to claim 14, wherein the magnetic nanoparticles are magnetite nanoparticles.

* * * * *